United States Patent [19]

Scheucher et al.

[11] Patent Number: 5,203,996
[45] Date of Patent: Apr. 20, 1993

[54] APPARATUS FOR PRESSING, DEWATERING OR FILTERING

[75] Inventors: Peter Scheucher, Kumberg; Dag Berglöff, Graz; Reinhart Pinter, Graz; Rupert Syrowatka, Graz, all of Austria

[73] Assignee: Maschinenfabrik Andritz Actiengesellschaft, Graz, Austria

[21] Appl. No.: 803,674

[22] Filed: Dec. 3, 1991

Related U.S. Application Data

[63] Continuation of Ser. No. 385,765, Jul. 26, 1989, abandoned.

[30] Foreign Application Priority Data

Aug. 11, 1988 [AT] Austria .................................. 2018/88

[51] Int. Cl.⁵ .............................................. B30B 9/24
[52] U.S. Cl. .................................. 210/386; 210/401; 100/120; 100/154; 100/211
[58] Field of Search ............... 210/386, 398, 399, 400, 210/401, DIG. 3; 100/118–120, 154, 211

[56] References Cited

U.S. PATENT DOCUMENTS

| | | | |
|---|---|---|---|
| 3,630,381 | 12/1971 | Gujer | 210/400 |
| 4,153,550 | 5/1979 | Lautrette | 210/66 |
| 4,834,884 | 5/1989 | Bergöff et al. | 210/386 |
| 4,851,119 | 7/1989 | Bergöff et al. | 210/401 |

FOREIGN PATENT DOCUMENTS

| | | | |
|---|---|---|---|
| 385681 | 5/1988 | Austria . | |
| 3725528 | 3/1988 | Fed. Rep. of Germany . | |
| 89000 | 7/1980 | Japan | 100/118 |
| 50100 | 3/1987 | Japan | 100/118 |

Primary Examiner—Matthew O. Savage
Attorney, Agent, or Firm—Seidel, Gonda, Lavorgna & Monaco

[57] ABSTRACT

The invention relates to an apparatus, in particular a machine, for the pressing and dewatering or filtering of sludges, fibrous material suspensions or cellulosic material suspensions, having two circulating filter belts or screen belts between which the material to be pressed, dewatered or filtered is made to pass, and two circulating pressure belts or supporting belts for supporting said two filter belts on their sides facing away from the material to be treated, with supporting or pressure means, in particular stationary during the operation of the apparatus, for the pressure or supporting belts on their sides facing away from the filter belts or the material to be treated. The invention is characterized mainly in that the supporting or pressure means form a tunnel, in particular a pressure space, preferably with straight longitudinal axis, in the compression, dewatering and filtering zone, the pressure and supporting belts being sealed against the tunnel or pressure space walls directly or indirectly, locally defined, in particular in several locations of the tunnel or pressure space, by elastic belts or the like at least essentially enclosing the pressure or supporting belts and the filter belts and the material to be treated on all sides.

37 Claims, 7 Drawing Sheets

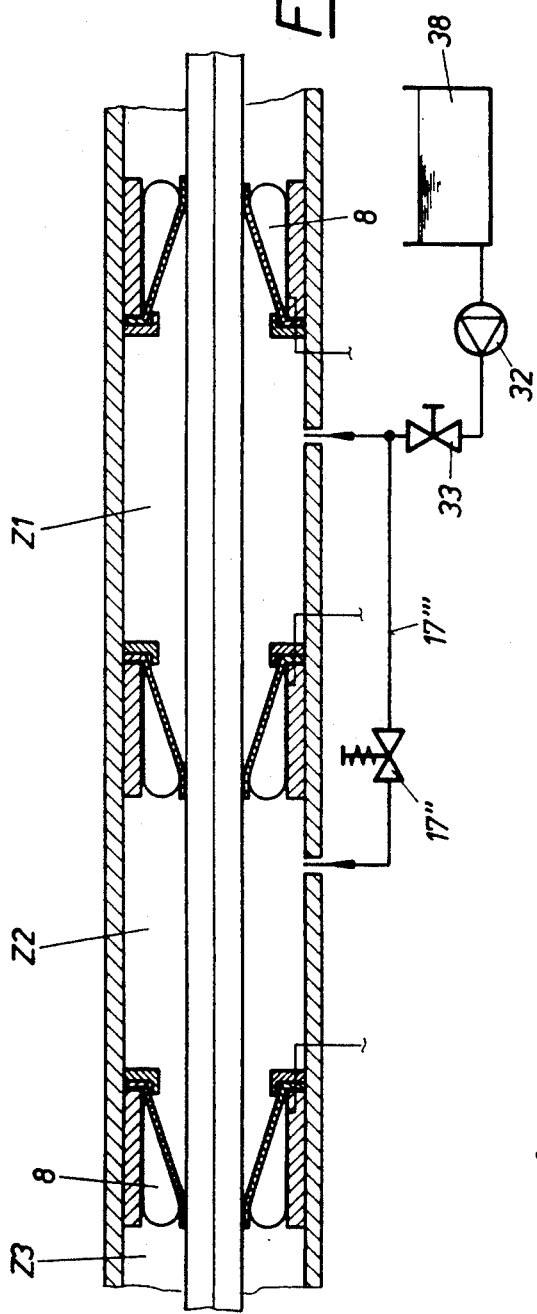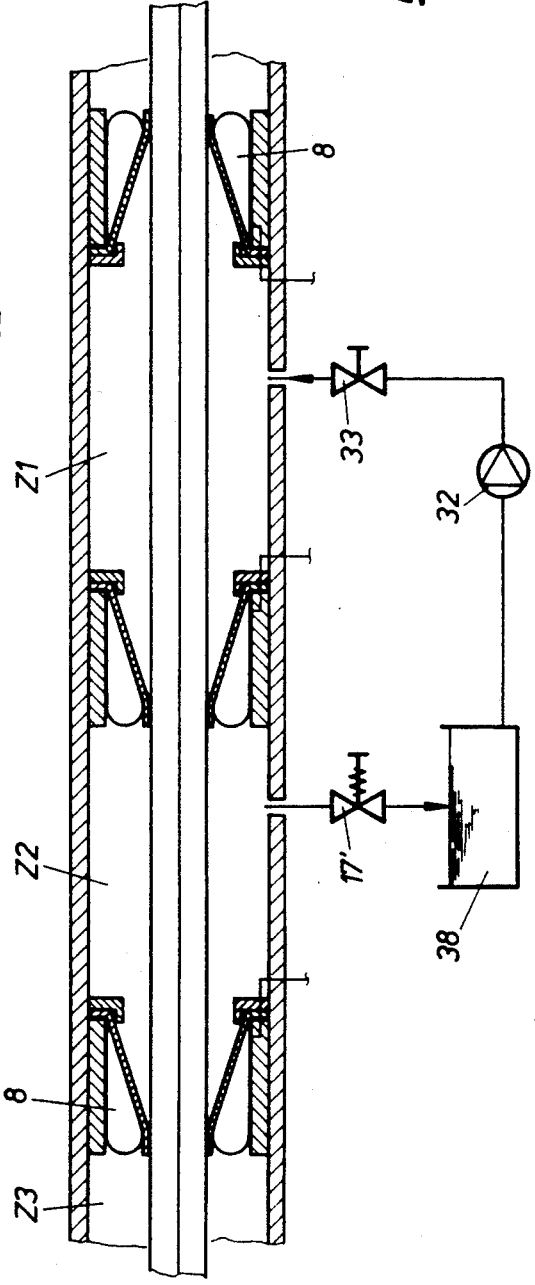

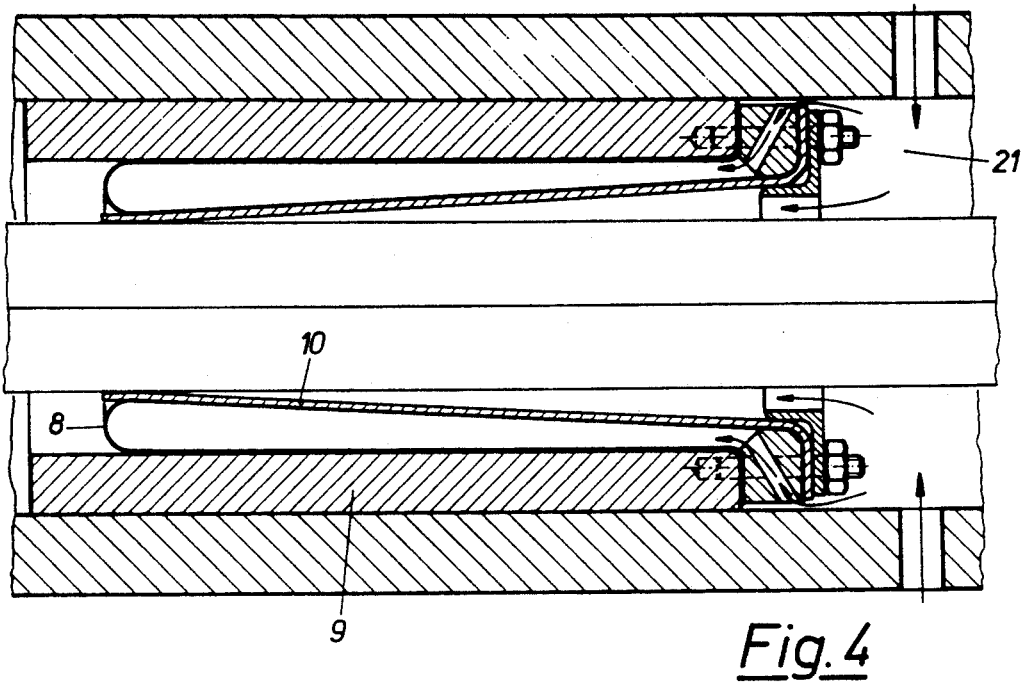
Fig. 4
Fig. 5
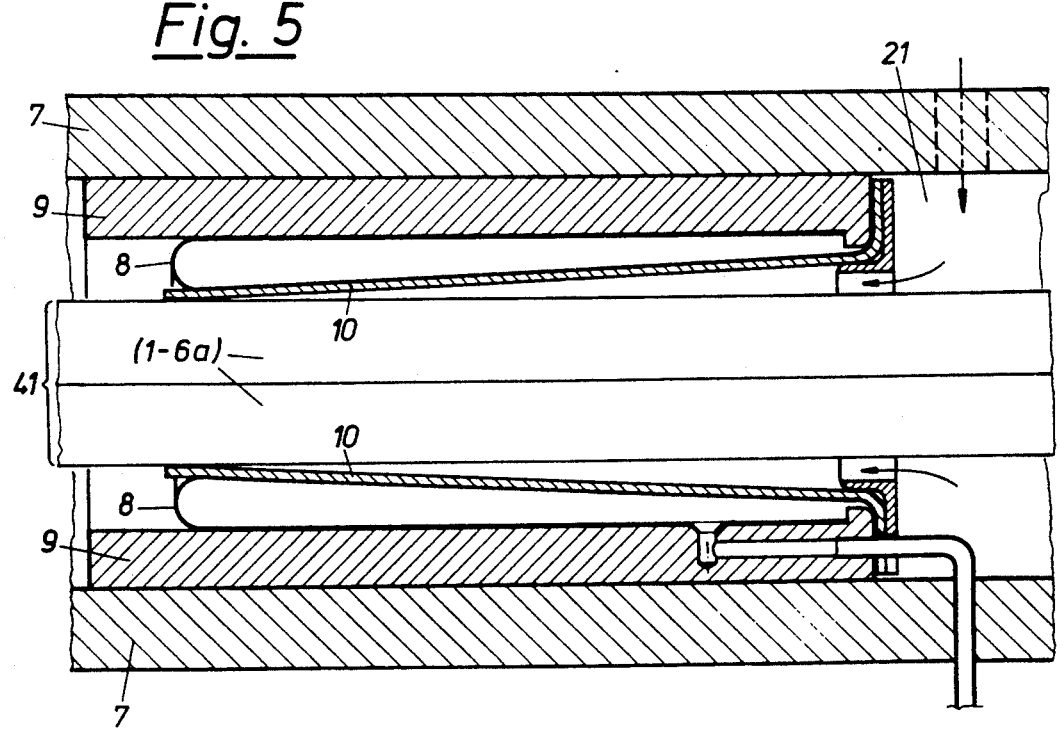

APPARATUS FOR PRESSING, DEWATERING OR FILTERING

This is a continuation of application Ser. No. 07/385,765, filed July 26, 1989, now abandoned.

The invention relates to an apparatus, in particular a machine, for pressing and dewatering or filtering of sludges, fibrous material suspensions or cellulosic material suspensions, having two circulating filter or screen belts between which the material to be pressed and dewatered or filtered is made to pass and two circulating pressure or supporting belts for supporting the two filter belts on their sides facing away from the material to be treated, as well as supporting and pressing means, in particular stationary during the operation of the apparatus for the pressure or supporting belts on their sides facing away from the filter belts and the material to be treated. The material to be pressed or treated is preferably introduced into the apparatus as a pretreated or dewatered material, such as in the form of a web, which may consist of uniformly charged crushed filter cake.

It is the object of the invention to provide an apparatus or machine of the type previously mentioned which exerts a continuous pressure over an extended period of time on the material to be treated and whose compression zone is formed in such a manner that the differences in the thicknesses of press materials and filter cakes as well as the compression of material and filter cakes can be well accommodated without loss of compression force.

This object is achieved according to the invention—starting out from the apparatus or machine initially described—in particular by providing for the supporting or pressing means to form a tunnel or the like, in particular a pressure space or cavity having a straight longitudinal axis, in the compression, dewatering or filtering zones, the pressure or supporting belts being sealed against the walls of the tunnel directly or indirectly, locally defined, in particular in several locations of the tunnel, by elastic belts or the like at least essentially enclosing the pressure and supporting belts and the filter belts and the material to be treated on all sides. This creates many possibilities of influencing the material to be treated within the apparatus or the machine, in particular because the pressures and thus the pressing of the material can be appropriately controlled in the sealed treatment tunnel. These effects can be particularly well influenced if the sealing belts are formed as closed or open hollow bodies, preferably as elastic hollow pads or bladders, in particular tube-like. A practical embodiment of the invention is characterized in that the cavities of the seals are connected to a pressure source, in particular a pump.

A preferred embodiment of the apparatus or machine according to the invention is characterized in that the elastic sealing belts, in particular the hollow bodies or hollow pads, are attached to the tunnel wall by means of inserts.

A convenient control of the pressing or filtering operation can be achieved according to the invention by providing at least three sealing belts between which compression zones, in particular of different pressures, are formed. If several compression zones are provided, it is convenient for the pressure to increase from compression zone to compression zone in the running direction of the belts and then to decrease towards the material outlet.

In practice, it may be particularly convenient to provide the pressure belts on the side of the screen belts with longitudinal grooves for discharging the pressed-out filtrate, in particular counter to the running direction of the belts, and to provide tubes or the like stationary and gliding during the operation of the apparatus in the longitudinal grooves for the discharge of the filtrate, the tubes or hoses conveniently extending from the entrance side of the pressure belts into the first compression zone. The filtrate discharge can conveniently be enhanced by providing for the belts to pass from inlet to outlet in a, particularly slightly, ascending path.

The control of the sealing problem and thus of the pressure conditions in the treatment tunnel created according to the invention is enhanced according to a further development of the invention by providing for the pressure belts to be thicker in their marginal zones than in their centers and/or for the outer edges of the pressure belts to be rounded, in particular in such a manner that the entire package of belts consisting of pressure belts, filter belts and material being treated, has a cross section of approximately rectangular shape with an approximately semicircular lateral boundary.

Sealing problems, pressure conditions and dewatering success may also be favorably influenced by providing for the pressure belts formed in particular thicker in their marginal zones than in their central zones to be in contact with one another in the marginal zones and to be provided there with at least one longitudinal groove in which a co-advancing sealing cable or rope is provided and for the tunnel or the like of in particular approximately rectangular cross section to be subject to pressure medium, in particular pressure fluid, conveniently at least between the first and the last sealing belt enclosing the belt package viewed in belt advancing direction.

The structural layout of an apparatus or machine according to the invention is conveniently such that the tunnel or the like in particular formed with rectangular cross section is formed by pressure plates and tong-like parts tightly gripping them laterally. It may be of advantage for the protection of the seals, but also for increasing the sliding capacity of the pressure belts, to provide wear protection sleeves between the belt package and the sealing belts, in particular the sealing hollow bodies, for instance sealing tubes, a gap conveniently being adjustable during the operation of the apparatus between sealing belts and pressure belts by means of leakage medium, in particular leakage fluid, for instance leakage water, but under certain circumstances also oil or alcohol.

In setting up the system according to the invention, the sealing belts may be formed divived, preferably at least once, the belt ends on the dividing joint(s) being mutually sealingly connected by clamping by means of inserts inserted into the tunnel or by means of adhesive. The wear protection sleeves are also formed divided, preferably in two parts, the conveniently overlapping part ends being suitable for mutual connection, in particular by means of adhesive.

In practice, the control of the pressure conditions is particularly facilitated by providing for the sealing belts formed as hollow bodies, hollow pads or bladders to be subject to various internal pressures exerted by a pressure medium. A particular influence on the pressure conditions can further be achieved by the individual, hollow sealing belts being composed of several hollow belt portions of which the cavities on the belt edge are subject to a medium of higher pressure during the operation of the apparatus than the remaining belt portions. To this end, the in particular hollow sealing belts in an approximately rectangular belt package or tunnel of approximately rectangular cross section can be composed of four, in particular hollow, portions, namely of one each portion extending above and underneath the belt package and one each portion extending over the lateral height or the thickness of the belt package, said four individual portions being mutually sealingly connected in the area of the package edges which are there conveniently faced at an angle of 45 degrees.

Even if favorable pressure conditions are maintained, the consumption of operating engergy can be kept particularly low if only the zone with the highest pressure in the tunnel is connected to a pressure source, in particular a pump, which introduces in particular pressure medium, conveniently pressure water, into said zone, and if the adjacent zones of the tunnel are subjected to pressure by means of the leakage water or the like flowing between the sealing belts and the belt packages.

A convenient circulation of the pressure medium can be achieved by providing for the leakage or compressed water to be drained or drawn off after flowing through the tunnel compression zones upstream of the sealing belts or sealing boxes in the inlet and outlet ends of the belts or of the tunnel, in particular to be connected to a working container taking up the pressure medium and connected to the pressure source, in particular the pump. The end sealing belts or sealing boxes are conventiently formed leakage-water-tight, in particular as hollow bodies with about 0.2 to 1 bar of superpressure in operation, preferably with air as the pressure medium.

The invention is explained in the following on the basis of exemplary embodiments with reference to the accompanying drawing, wherein FIG. 1, FIG. 1a and FIG. 1b are schematic representations of dewatering apparatus or machines provided with the pressing or compression means according to the invention;

FIG. 4 and 5 show similar sectional views through the seals and immediately adjacent apparatus and machine parts.

Figure 1:
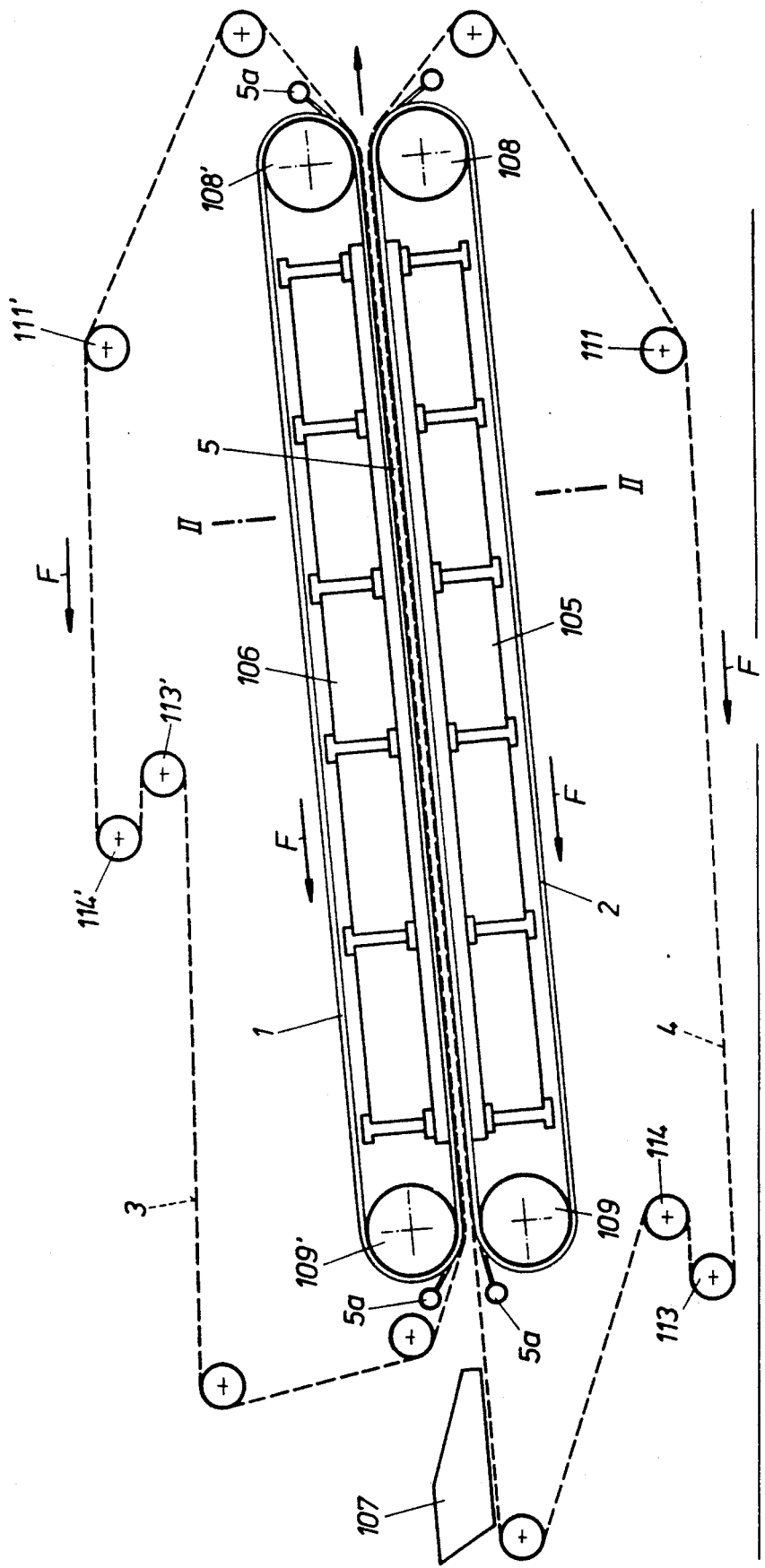

The dewatering machine of compact construction schematically represented in FIG. 1 comprises a lower endless filter belt 4 and an upper endless filter belt 3 between which the material to be dewatered is made to pass. The lower filter belt 4 is formed as a supporting screen and passed over a number of rolls, namely a screen belt adjusting roll 111, a deflection roll 114 and a tension roll 113. The upper filter belt is formed as a cover screen and made to pass over guide rolls 114', a tension roll 113' and an adjusting roll 111'.

The material to be dewatered is charged from a charging device 107 onto the lower filter belt 4 so that a cake of approximately uniform thickness is formed to be dewatered between the two filter belts 3,4.

In the compression zone, the two filter belts 3, 4 are supported by circulating, endless pressure belts 1 and 2. The lower pressure belt 2 and the upper pressure belt 1 are trained over deflection rolls 109, 109' and optionally over tension rolls and adjusting rolls. The drive may act on rolls 108, 108'. Smaller deflection rolls may be provided at the start and end of the pressing line. The pressure belts 1,2 are made of elastic material impermeable to water and liquids, such as rubber or plastics materials. The supports 105, 106 serve for subjecting the pressure belts 1,2, the filter belts 3, 4 and thus the press cake lodged therebetween to the required compression force. These supports 5, 6 take up the entire compression force and to this end are of very sturdy construction. On both sides of the dewatering machine, the upper and lower supports 105, 106 are connected to one another so as to obtain a short transmission path of the entire forces. This has the advantage that the very high compression forces do not have to be transmitted to the machine bed (foundation) so that this machine bed can be of comparatively light and inexpensive construction. According to the invention, the transmission of forces from the supports 105, 106 to the mobile pressure belts 1,2 is effected by a special hydrostatic pressure means represented in detail mainly in FIG. 2 to 5.

Figure 1A:
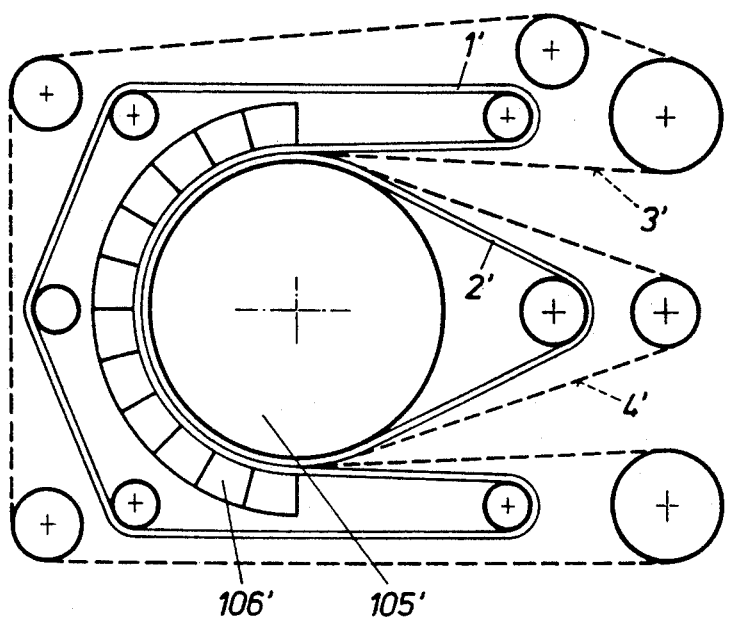

While the compression zone in FIG. 1 is linear, FIG. 1a schematically shows a curved compression zone. The pressure belts in this case bear the reference numbers 1', 2', while the filter or screen belts are designated 3', 4'. The supports for the pressure belts are the drum 105', on the one hand, and the curved body 106', on the other hand. The linear compression zone could be replaced by those of convex or concave curvature if necessary.

Figure 1B:
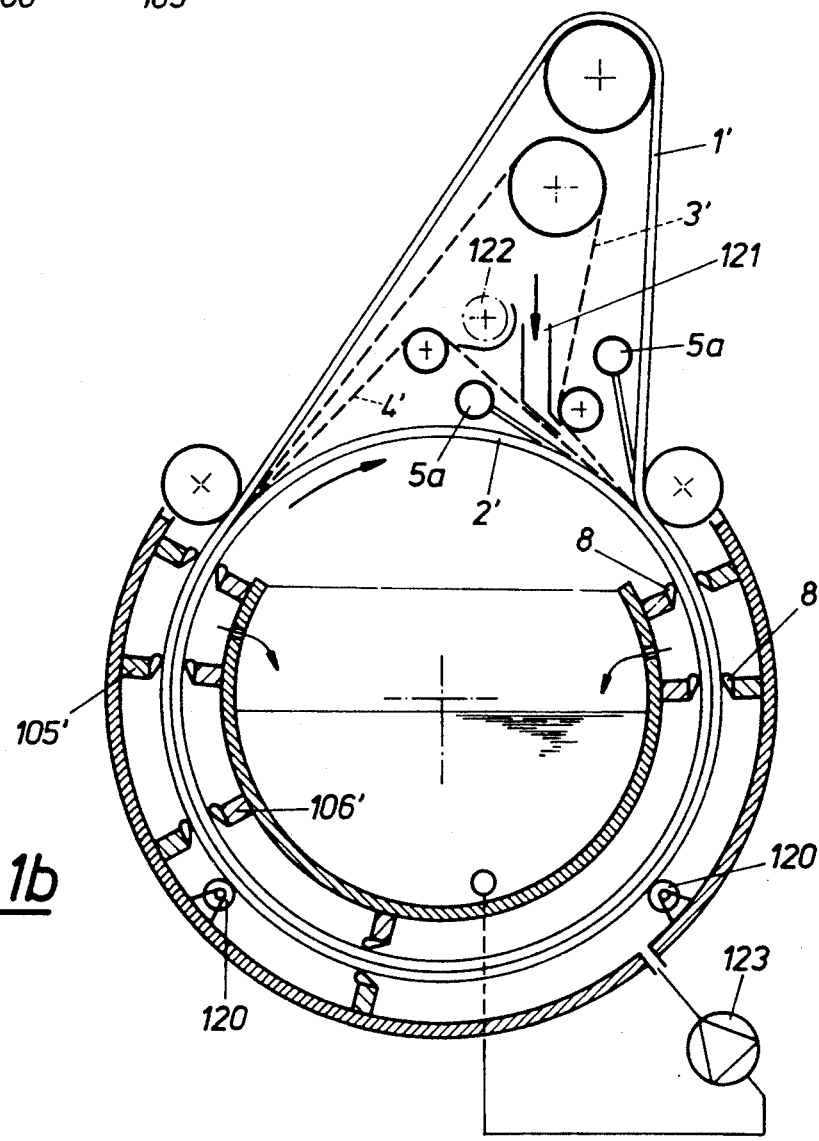

FIG. 1b shows a similar variant. Filter or screen belts 3,',4' are subject to the action of pressure means 1', 2', the pressure means 1' being formed as a belt, the pressure means 2' being formed as a circulating, optionally driven torus or supporting ring resting or centered e.g. on supporting rolls 120. The material is charged at 121. A discharge means for the pressed material is designated 122. A pump 123 or another pressure source supplies the required pressure conditions outside of the pressure means (torus 2', belt 1'). Supports 105', 106' act on the pressure means 1', 2' and the filter belts or screen belts 3',4' via hydrostatic pressure devices to be described in the following.

The pressure belts 1,2 are conveniently provided on the screen side with longitudinal grooves (FIG. 2) 1a, 2a through which the filtrate is discharged counter to the direction of belt advance (see arrow F) (FIG. 1).

Figure 2:
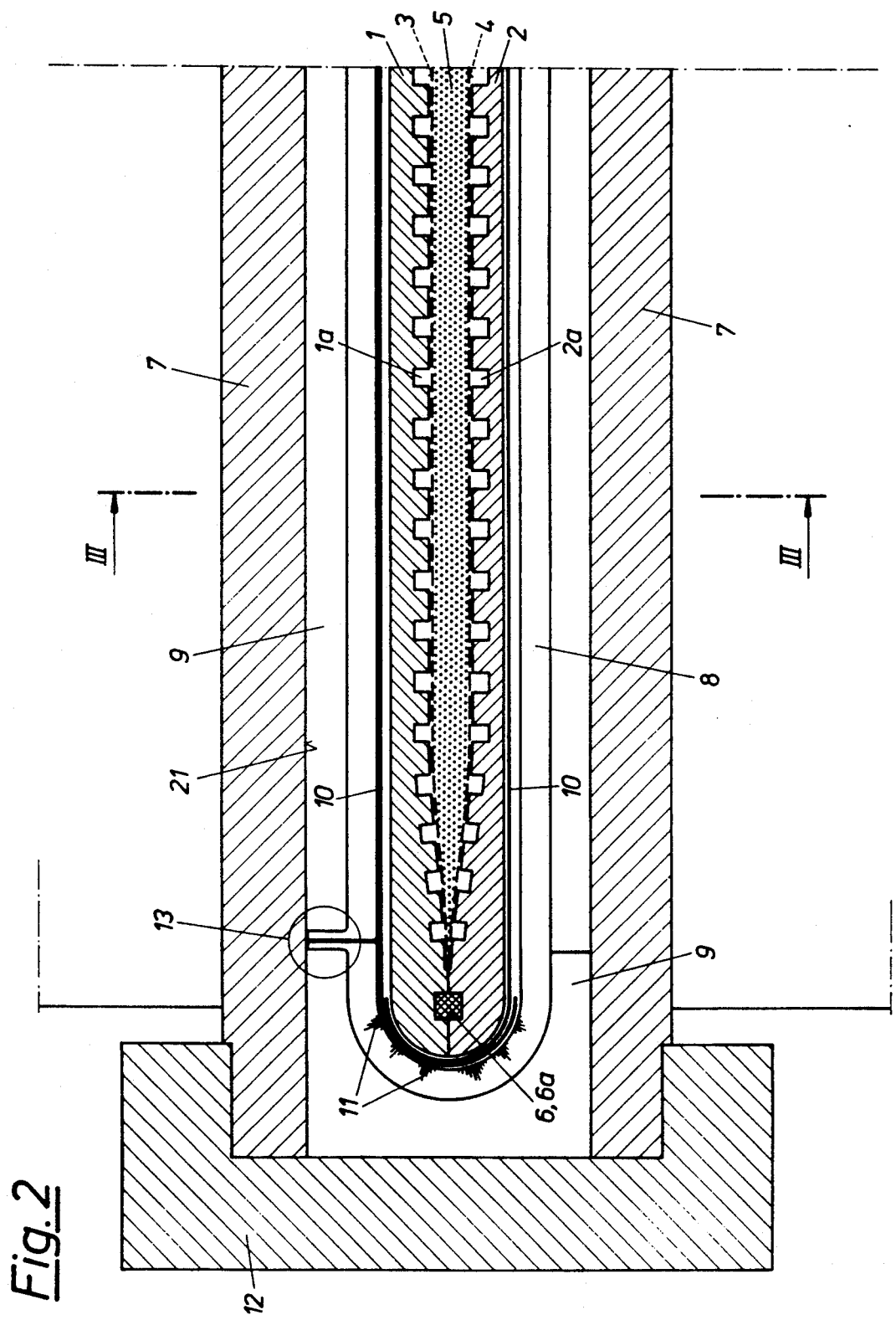
FIG. 2 shows a cross section in enlarged scale through the core part of the machine or the apparatus along line II—II in FIG. 1.

The filtrate is conveniently sucked off according to FIG. 2 by stationary tubes or hoses 5a (also refer to FIG. 1) sliding in the longitudinal grooves 1a, 2a, one each tube or hose preferably being associated with each groove. As evident from FIG. 1, these tubes conveniently reach from the inlet side of the belts 1,2 to the first compression zone to prevent filtrate sucked back from wetting the still unpressed cake. Sucking back of the filtrate is conveniently enhanced by a belt path slightly ascending in running direction (see FIG. 1)

FIG. 2 shows a section along line II—II in FIG. 1, thus perpendicular to the advance direction of the apparatus or machine. The pressure belts 1,2 are thicker in their marginal zones and formed for instance rounded on their edges, so that the entire belt package composed of pressure belts 1,2, filter belts 3,4 and the treated material or cake 5 is of approximately rectangular cross section with laterally attached semicircles. It is also possible, however, to provide chamfers instead of the roundings or a polygon as the edge boundary or a belt package with rectangular cross section.

The pressure belts 1,2 are provided near their edges with grooves 6a in which sealing cables 6 preventing the penetration of compressed water between the pressure belts and at the same time mutually centering the two belts are co-advancing. This constitutes guiding and sealing grooves in circulating direction.

The belt package passes a rectangular channel charged or filled with a pressure medium, preferably a pressure fluid, said channel being sealingly enclosed on top and bottom by the pressure plates 7 and on its sides by the tongs 12, so that a tunnel 21 is formed. This channel or tunnel 21 is subdivided in advancing direction into several compression zones Z1 to Z5 (FIG. 3), for instance with pressures increasing in advance direction.

According to the invention, special boundaries allowing movement of the belt package at simultaneous tight sealing action are provided at the inlet and outlet of the belt package into the tunnel 21 and out of the tunnel 21 and at the separating sites between the individual compression zones, Z1 to Z5. According to the invention, the seals are elastic seals 8, in particular in the form of tubes or hoses, enclosing the belt package.

The boundaries of the compression zones Z1 to Z5 are preferably self-adjusting bladder seals 8 directly installed in the channel or tunnel 21 by means of an insert 9. A small amount of leakage water is allowed to flow between the belt package and a wear protection sleeve 10 to be preferably provided so that the belt package can be pulled essentially without contact and thus with low friction through the seals consisting of bladder seal 8 and wear protection sleeve 10. These bladder seals separate the compression zones Z1 to Z5 enclosing the entire belt package from one another and also insulate them against the environment. This is possible because this seal is disposed around the belt package normally to the belt advance direction and thus encloses the entire belt package.

The bladder seals 8 consist of resiliently elastic and dense material having tensile strength, for instance rubber with a fabric insert. The bladder seal 8 is fastened by means of an insert 9 to be described later on.

Each bladder seal on principle encloses the belt package endlessly. As previously described, a wear protection sleeve 10 is provided between the bladder seal 8 and the belt package and protects the bladder seal against wear.

The sleeve 10 also passes around or encloses the belt package endlessly on principle, but for assembling reasons is preferably formed in two portions, with top and bottom portion of the sleeve 10 overlapping in the marginal zone.

The bladder seal may also be divided into several portions instead of only one. Each bladder seal thus consists of several portions, with the ends of the individual bladders possibly clamped into the insert 9. So, for instance, it is possible for better adaptation of the amount of leakage water to subject the individual bladders located in the zone of the belt edge to higher pressures than the individual bladders disposed on the plane belt surface.

Figure 2A:
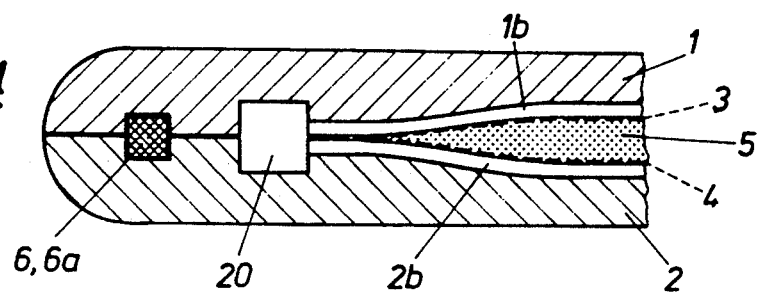
FIG. 2a to 2e show variants in similar sections, although only partially represented, FIG. 3, 3a and schematic longitudinal sections along line III—III in FIG. 2.
Figure 2B:
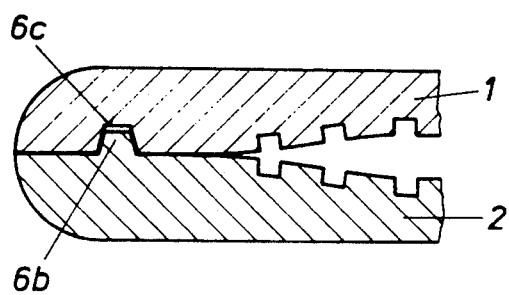
Figure 2C:
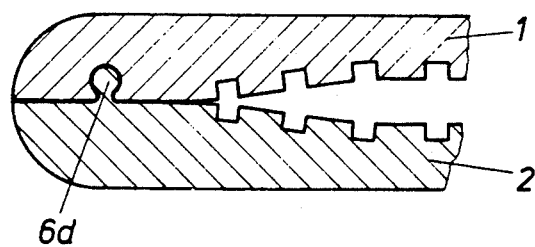
Figure 2D:
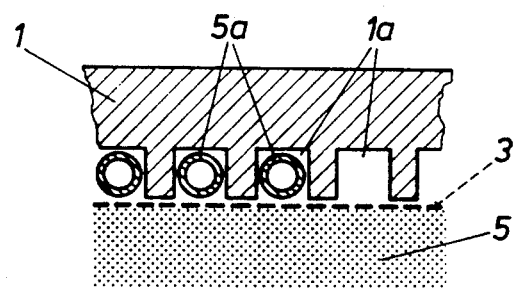
Figure 2E:
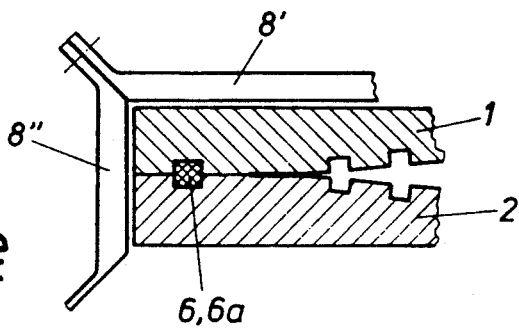

At rectangular embodiment of the belt package, the division could be effected into four portions 8', 8" according to FIG. 2e, with two individual bladders (8') extending over the entire belt width and two individual bladders (8") extending merely over the thickness of the belt package. The individual bladders 8', 8" preferably abut at an angle of 45 degrees.

Figure 3:
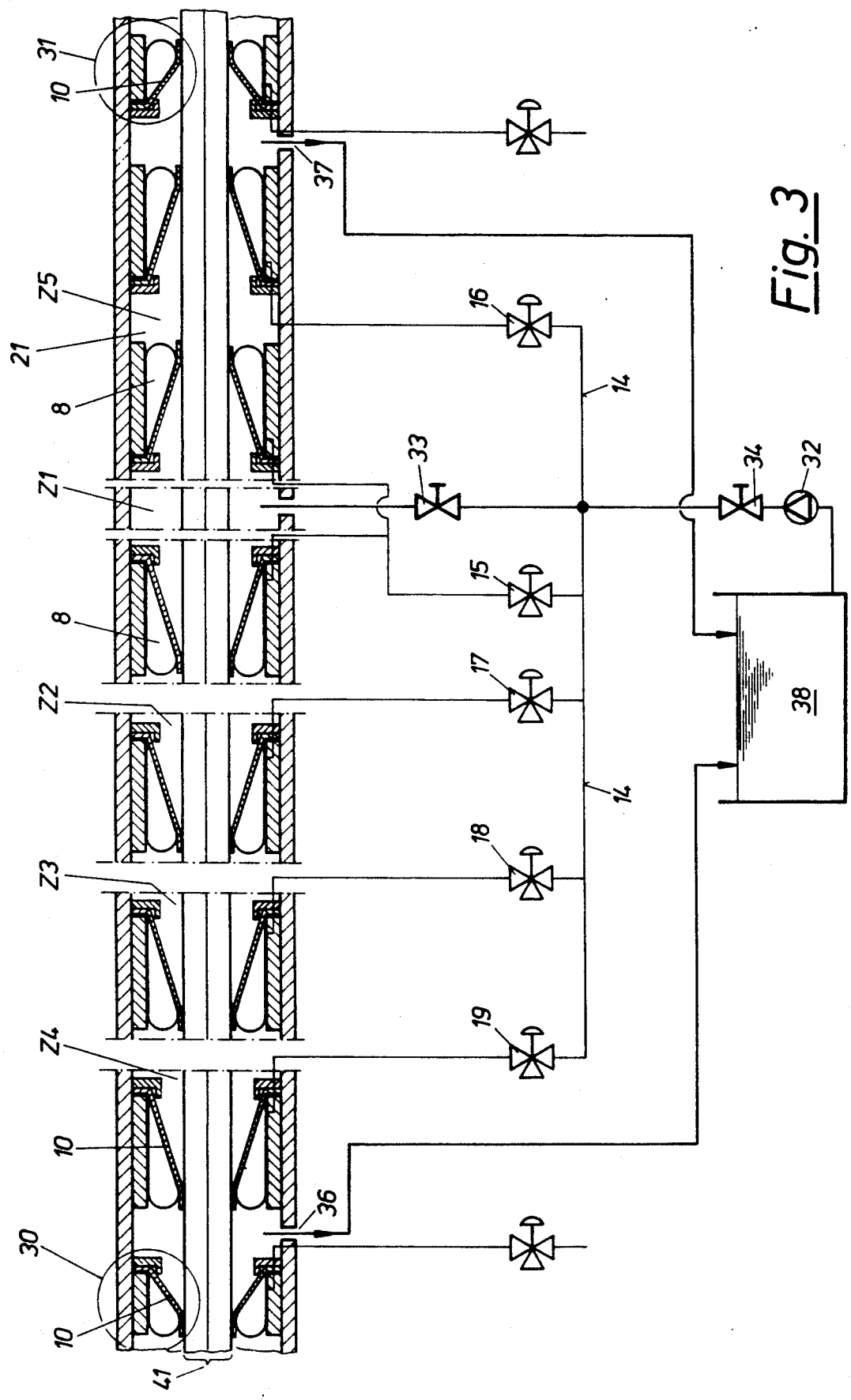

FIG. 3 shows a schematic longitudinal section in machine advance direction representing the arrangement of the compression zones. FIG. 3 shows an exemplary arrangement of several boundaries in the form of sealing inserts with pressure bladders so that five different compression zones Z1 to Z5 are created. Further seals 30 and 31 serve for separating the leakage water.

The zone Z1 with the highest pressure is supplied with pressure fluid, preferably water, by a pump 32. The amount of water supplied passes the adjacent sealing inserts or boundaries 8 in the adjacent compression zones Z2, Z5 of lower pressure as leakage water and passes to the subsequent compression zones Z3, Z4. If the arrangement is composed of seveal stages, the amount of leakage water need be used up only once and the pressure can be reduced via any given number of sealing inserts and thus compression zones. This means reduced pump output for the generation of compression force and moreover permits high compression forces, as the pressure bladder is only subject to the respective differential pressure between the two compression zones and the bladder material is thus not too highly stressed.

After the last compression zones in the direction of the leakage water flow (upstream of the seals 30 and 31), drains 36, 37 through which the compressed water is conveyed to a working container 38 and thus returned to the circulating pump 32 are provided in the channel or tunnel 21.

Sealing boxes 30, 31 provided outside of the drains 36 and 37 in the channel or tunnel 21 prevent the leaking of the nearly pressureless circulating water from the machine or apparatus. These sealing boxes are of the same construction as the zone boundaries, but subject to about 0.2 to 1 bar of superpressure and preferably fed with air as a pressure medium, so that the wear protection sleeves 10 of these seals, for instance consisting of teflon, are tightly pressed against the belt package 41 so that virtually no leakage water escapes. This is a sliding seal without leakage water. Although the friction is higher as compared to a seal with leakage water, it can be controlled without difficulty due to the low pressures and by the selection of a material with good sliding properties for the sleeve.

In the compression zones, the pressure is preferably adjusted in such a manner that the pressure is increased up to the main compression zone Z1 in machine advance direction at increasing dry matter content of the press goods or the cake and thus increasing strength of the material or cake. At the machine outlet, the pressure is decreased depending on the desired pressure difference per sealing insert in one or a plurality of sealing inserts 8 arranged one behind the other. FIG. 3a and 3b show further variants schematically and in partial representations. According to FIG. 3a, pressure reducing valves 17" are provided. This embodiment applies to the case in which the subsequent zones Z2 et seq. are to be supplied with appropriate additional quantities. This is necessary if the desired pressure gradient or the geometry of the bladders calls for the amount of leakage fluid from zone Z1 to zone Z2 to be smaller than that from zone Z2 to Z3, and so forth. The supplementary quantities are supplied by the pump 32 via line 17'" and pressure reducing valve 17".

A further variant is shown in FIG. 3b. Again, the main volume of pressure fluid flows from the pump 32 first into the zone Z1 of the highest pressure; the subsequent zones Z2 et seq. are kept at the desired lower pressures via pressure maintenance valves 17'. Possible quantities in excess are withdrawn. If the desired pressure gradient or the bladder geometry shows that the amount of leakage fluid from zone Z1 to zone Z2 exceeds that from Z2 to Z3, and so forth, controlled drainage from zone Z2 et seq. to the container 38 is applied.

Exemplary embodiments of seals according to the invention are described in the following. Reference is first made to FIG. 4 which represents a sectional view in longitudinal machine direction. The pressure bladder 8 is arranged with pressure compensation to the compression zone. FIG. 5 shows a further variant in section in longitudinal machine direction. In this case, the pressure bladder 8 is subject to pressure applied from the outside.

First of all, the control of the pressure adjustment in the individual zones when using sealing inserts with pressure compensation according to FIG. 4 is described. The main compression zone (Z1) is supplied with compressed water by a pump 32. The amount of compressed water supplied passes the successively arranged sealing inserts 8 as leakage water and the pressure is gradually decreased, whereby approximately equal differential pressures per sealing unit (per flow direction) are adjusted. The value of the differential pressure is fractionally approximated starting from the main compression zone (Z1) and the value of the pressure prevailing there and the number of sealing inserts per leakage water flow direction.

At equal bladder geometry for all bladder seals, the amount of leakage water correspondingly increases upstream and downstream of the sealing insert 8 at increasing differential pressure.

Since the pressures in the zones are to be graduated according to the compressive strength of the treated material or cake increased by the dewatering, varying differential pressures at the individual sealing inserts are required.

These can be achieved by draining pressure fluid from individual zones (pressure controls 15 to 19) in the case of lower differential pressures and by additional supply of pressure fluid to individual compression zones in the case of higher differential pressures.

The following example describes a control of the pressure adjustment when using sealing inserts 8 subject to pressure applied from the outside according to FIG. 5. This type of pressure control makes use of the following operating behavior of the bladder seals 8: at predetermined bladder geometry, the leakage water amount can be decreased by increasing the pressure in the bladder in respect of the pressure in the compression zone upstream. At lower pressure in the bladder seal 8 as compared to the compression zone, the leakage water volume increases accordingly. This method permits an adjustment of the bladder seal at predetermined bladder dimension to different belt package thicknesses, for instance different cake thicknesses or belt and cake compressed by pressure.

Pressure control is preferably effected as shown in FIG. 3. A pump 32 supplies the main compression zone Z1 from a working container 3B. A throttle, e.g. a throttle valve 34, downstream of the pump permits the volume adjustment. A flow resistance 33 from which a supply line 14 leads to the (adjustable) pressure controls 15 to 19 and further to the bladder seals 8 is provided downstream of the throttle valve. The desired pressures can thus be adjusted by means of these pressure controls.

The leakage water volume passing through the individual sealing inserts 8 per flow direction is equal. A larger gap forms in the case of sealing inserts with lower pressure differential of the adjacent zones. The amount of water must be adjusted so that the gap is large enough at the sealing insert with the highest differential pressure of the adjacent zones to assure the proper operation of the machine. In summarizing, the following features are emphasized as essential to the present invention: the belt package, consisting of upper and lower supporting belts 1,2 with longitudinal grooves 1a, 2a for dewatering and lateral guiding grooves 6a, lateral sealing cables 6, upper and lower filter belts 3,4 with material to be pressed lodged therebetween, passes a pressure channel or tunnel 21 having one or a plurality of compression zone(s), for instance Z1 to Z5, the pressure fluid, preferably water, enclosing the belt package on all sides, and the compression zones are separated by the seals 8 disposed in the pressure channel and enclosing the belt package perpendicularly to the advance direction. Added to this is the previously mentioned device with self-adjusting bladder seals 8 so that a small gap of e.g. 0.05 mm to the belt package is adjusted so that a leakage water volume fed to the main compression zone passes the zone boundaries arranged one behind the other and the belt package can be drawn through the seals with very little friction.

The bladder seals shown in FIG. 4 are of open connection to the compression zone upstream and the gap and thus the leakage water volume is self-adjusting as a function of the geometry and pressure differential between the adjacent zones. The bladder seals represented in FIG. 5 are separately subjected to pressure, the leakage water volume can be varied in this case by applying a pressure differential to the compression zone upstream at given bladder geometry and differential pressure of the adjacent zones. The bladder seal with separate pressure supply according to FIG. 5 is subjected to that pressure which is desired in the zone upstream.

The pressed-out filtrate is sucked off through the tubes or hoses 5a extending in the longitudinal grooves up to the area of the first compression zone so as to prevent any remoistening of the cake in zones which are no longer (so strongly) pressed. This can also be achieved by blowing or sucking on the outlet side.

As already mentioned, a slight rise of the pressure channel or tunnel 21 and the belt package in advance direction can enhance the sucking off of the filtrate. To this end, the previously mentioned apparatus provided with leakage water discharge and secondary seals may be convenient, the secondary seals being bladder seals, but with superpressure inside of the bladder and sliding arrangement. The aforementioned measures may be supplemented by a pressure control according to FIG. 3 and an automatic advance control of the belt package by bladder seals. A convenient feature is the self-centering effect of the bladder seals on the belt package.

FIG. 2b and 2c show further variants of the pressure belt guiding seal, namely, FIG. 2b with wedge-shaped strip 6b with corresponding counter recess 6c and FIG. 2c with a kind of zipper 6d.

FIG. 2a shows a further exemplary embodiment in respect of dewatering and discharge of the filtrate. The pressure belts 1,2 are provided with transverse grooves 1b, 2b terminating in (a) longitudinally extending drainage channel(s) 20.

We claim:

1. An apparatus for the treatment of sludges, fibrous material suspensions or cellulosic material suspensions by pressing and dewatering or filtering, comprising:

two circulating filter belts, each belt having a side thereof facing the other belt, between which the material to be treated is made to pass;

two circulating pressure belts for supporting the sides of the filter belts which face away from the material to be treated, the pressure belts and filter belts forming a belt package wherein the filter belts are disposed between the pressure belts with the material to be treated passing between the filter belts;

means for circulating said pressure belts and filter belts in a moving direction, means for supporting the belt package, which includes enclosing walls forming a tunnel through which the belt package is disposed, said tunnel having an inlet end and an outlet end, and said belt package moving through the tunnel in said moving direction from the inlet end to the outlet end;

a plurality of sealing members attached to the walls of the tunnel and extending completely around the belt package transverse to said moving direction of the belt package, said members providing a seal between the tunnel walls and the belt package;

a source of fluid under pressure; and means for introducing fluid from said source into the tunnel between adjacent sealing members to form compression zones along the belt package whereby fluid pressure may be applied to said belt package to compress the material to be treated.

2. The apparatus according to claim 1, wherein the tunnel has a straight longitudinal axis.

3. The apparatus according to claim 1, wherein a portion of each of said sealing members is formed as an elastic body having a cavity therein, and said apparatus further comprising means for communicating fluid under pressure into such cavities.

4. The apparatus according to claim 3, wherein each sealing member cavity is comprised of a hollow bladder.

5. The apparatus according to claim 3, wherein each sealing member is generally tubular.

6. The apparatus according to claim 3, wherein the cavities of said sealing members are in fluid communication with the respective compression zones formed by said sealing members via said means for communicating.

7. The apparatus according to claim 3, wherein the cavities of said sealing members communicate with said compression zones and the cavities of other sealing members via said measn for communicating.

8. The apparatus according to claim 3, wherein the cavities of the sealing members are connected to said source of fluid under pressure via said means for communicating.

9. The apparatus according to claim 1, wherein the sealing members are attached to said tunnel walls by insert means.

10. The apparatus according to claim 1, wherein at least three compression zones are provided in series from the inlet end to the outlet end of the tunnel.

11. The apparatus according to claim 10, further comprising means for regulating the pressure of the fluid in said compression zones to produce compression zones of different pressure.

12. The apparatus according to claim 11, wherein the compression zones are connected with said pressure source so that the pressure in the compression zones increases progressively from the inlet end of the tunnel to a zone of maximum pressure and then decreases towards the outlet end of the tunnel.

13. The apparatus according to claim 12, wherein only the compression zone of the highest pressure in the tunnel is connected to said source of fluid under pressure, and the adjacent compression zone of the tunnel are subjected to pressure by the pressure fluid flowing between the elastic sealing belts and the belt package.

14. The apparatus according to claim 13, wherein draining means drain the pressure fluid from compression zones at the inlet and outlet ends of the tunnel.

15. The apparatus according to claim 14, wherein collecting means collects the drained pressure fluid into a working container connected to the pressure source.

16. The apparatus according to claim 12, further comprising pressure reducing valves connected to the compression zones for maintaining the successive zones at the required pressures by withdrawing fluid from said zones as required.

17. The apparatus according to claim 16, wherein the means for supplying fluid under pressure provides the main volume of pressure fluid in the compression zone of the highest pressure and maintains the successive compression zones at the required pressure by said pressure reducing valves.

18. The apparatus according to claim 12, wherein the means for supplying fluid under pressure supplies a main volume of pressure fluid into the compression zone of the highest pressure and maintains the successive compression zones at the required pressures by feeding appropriate additional fluid to such zones.

19. The apparatus according to claim 12, further comprising pressure maintaining valves connected between said compression zones and said pressure source for directing a quantity of pressure fluid in the successive zones at the required pressures.

20. The apparatus according to claim 1, wherein each pressure belt has longitudinal grooves on its side adjacent to a respective said filter belt for discharging pressed-out filtrate.

21. The apparatus according to claim 20, further comprising discharging means for evacuating pressed-out filtrate from said grooves.

22. The apparatus according to claim 21, wherein said discharging means include tubes aligned with and disposed in the longitudinal grooves of the circulating pressure belts along the belt package for discharging the filtrate.

23. The apparatus according to claim 22, wherein the belt package includes an inlet side for the material and wherein said tubes extend from the inlet side into the compression zone closest to the inlet side.

24. The apparatus according to claim 20, wherein the belt package is made to pass in an ascending path, relative to the horizon, through the tunnel.

25. The apparatus according to claim 1, wherein each pressure belt includes a marginal zone along each lateral edge of said belt and a center zone extending between said marginal zones, and wherein each belt is thicker in said marginal zones than in said center zone.

26. The apparatus according to claim 1, wherein the pressure belts are rounded off on their lateral edges.

27. The apparatus according to claim 26, wherein the pressure belts are rounded off on their lateral edges in such a manner that the entire belt package has a cross section of approximately rectangular form with an approximately semicircular lateral boundary.

28. The apparatus according to claim 1, wherein each pressure belt includes a marginal zone which extends along each lateral edge of said belt, the pressure belts being in contact with one another by their respective marginal zones in the belt package, and wherein each said marginal zone includes at least one longitudinal groove in which a co-advancing sealing cable is provided within the belt package.

29. The apparatus according to claim 28, wherein the pressure belts include a center zone extending between said marginal zones, and are formed thicker in their marginal zones than in their center zone.

30. The apparatus according to claim 1, wherein the tunnel is formed with approximately rectangular cross section and straight longitudinal axis.

31. The apparatus according to claim 30, wherein the tunnel is formed by pressure plate and tong-shaped parts tightly gripping lateral edge portions of said pressure plates.

32. The apparatus according to claim 30, wherein each sealing member is divided into four portions, one portion extending across each of the four sides of the rectangular tunnel, the ends of each portion being mutually sealingly connected to the end of an adjacent portion.

33. The apparatus according to claim 32, further comprising said sealing members having wear protection sleeves disposed between the belt package and the sealing members wherein the wear protection sleeves are divided in parts around the belt package, the adjacent ends of said parts being mutually sealingly connected.

34. The apparatus according to claim 1, further comprising said sealing members having wear protection sleeves disposed between the belt package and the sealing members.

35. The apparatus according to claim 1, wherein a portion of each of said sealing members is formed as an elastic body having a plurality of cavities therein, and said apparatus further comprising means for communicating fluid under pressure into such cavities, and means for regulating the pressure in the cavities such that cavities disposed near the lateral edges of the pressure belts are subjected to higher pressure in operation than the remaining cavities.

36. The apparatus according to claim 1, wherein the sealing members adjacent said inlet and outlet ends of the tunnel are formed leakage-water-tight in operation.

37. The apparatus according to claim 1, wherein the sealing members adjacent said inlet and outlet ends of the tunnel are formed as hollow bodies with 0.2 to 1 bar of internal pressure.

* * * * *